(12) United States Patent　　　　　(10) Patent No.: US 12,687,238 B2

Leger et al.　　　　　　　　　　　　(45) Date of Patent: Jul. 21, 2026

---

(54) SYSTEMS AND METHODS FOR VALVE ACTUATION

(71) Applicant: Fisher Controls International LLC, Marshalltown, IA (US)

(72) Inventors: Bryan Leger, Marshalltown, IA (US); Trent Jackson, Marshalltown, IA (US); Wade Helfer, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 116 days.

(21) Appl. No.: 18/425,746

(22) Filed: Jan. 29, 2024

(65) Prior Publication Data

US 2025/0243946 A1　　Jul. 31, 2025

(51) Int. Cl.
*F16K 31/40*　　　　(2006.01)

(52) U.S. Cl.
CPC ................................. *F16K 31/406* (2013.01)

(58) Field of Classification Search
CPC ........ F16K 31/46; F16K 31/502; F16K 31/53; F16K 31/406; F16K 31/1245; F16K 1/00; F16K 1/126; F16K 17/32; F16K 31/1221; F16K 31/363; F16K 31/1223; F15B 2013/044; F15B 15/202
USPC .................................................. 251/12–63.6
See application file for complete search history.

(56) References Cited

U.S. PATENT DOCUMENTS

| | | | |
|---|---|---|---|
| 845,063 A * | 2/1907 | Desper | F16K 1/126 |
| | | | 251/44 |
| 1,736,938 A * | 11/1929 | Alfred | F16K 1/126 |
| | | | 137/220 |
| 1,750,417 A * | 3/1930 | McClellan | F16K 1/126 |
| | | | 137/219 |
| 1,829,703 A * | 10/1931 | Larner | F16K 1/126 |
| | | | 137/557 |
| 1,987,819 A * | 1/1935 | Foulds | G05D 16/166 |
| | | | 137/220 |
| 2,799,466 A * | 7/1957 | Hickerson | F16K 31/406 |
| | | | 251/44 |
| 2,919,714 A * | 1/1960 | Mrazek | G05D 16/2095 |
| | | | 137/220 |
| 2,975,800 A * | 3/1961 | Doelger | F16K 31/143 |
| | | | 137/565.14 |

(Continued)

OTHER PUBLICATIONS

Type FLV Axial Control Valve Product Sheet, Bulletin D104500X012, https://www.emerson.com/documents/automation/data-sheets-type-flv-axial-control-valve-tartarini-en-en-6634658.pdf, Feb. 2024, 8 sheets.

(Continued)

*Primary Examiner* — Marina A Tietjen
(74) *Attorney, Agent, or Firm* — Quarles & Brady LLP

(57) ABSTRACT

A valve system can include a valve body having an inlet and an outlet, a valve member moveable between open and closed positions to fluidically couple and decouple the inlet and the outlet, and an actuator. The actuator can include an actuation chamber, an actuator member to move the valve member, ports, and a control system. The ports can be arranged to permit flow from the inlet to first and second volumes of the actuation chamber, and to permit flow from the first and second volumes of the actuation chamber to the outlet. The control system can selectively direct fluid flow through the ports.

20 Claims, 7 Drawing Sheets

(56) References Cited

U.S. PATENT DOCUMENTS

| | | | | |
|---|---|---|---|---|
| 3,297,047 A * | 1/1967 | Sime | ..................... | F16K 31/406 |
| | | | | 137/220 |
| 3,307,786 A * | 3/1967 | Salerno | ................... | F16K 31/42 |
| | | | | 137/489.5 |
| 3,533,434 A * | 10/1970 | Smith | .................. | F16K 31/406 |
| | | | | 137/220 |
| 6,244,561 B1 * | 6/2001 | Hansen, III | ........... | F25B 41/345 |
| | | | | 251/30.05 |
| 2011/0193001 A1* | 8/2011 | Farner | ................... | F16K 31/406 |
| | | | | 251/324 |
| 2012/0012766 A1* | 1/2012 | Gauss | ..................... | F16K 1/123 |
| | | | | 251/129.01 |
| 2014/0124059 A1* | 5/2014 | McAuliffe | .............. | F16K 1/126 |
| | | | | 137/492 |
| 2015/0083945 A1* | 3/2015 | Jakobsen | ............ | F16K 31/1221 |
| | | | | 251/30.02 |
| 2016/0312913 A1* | 10/2016 | Thybo | ................. | F16K 31/1245 |
| 2018/0128394 A1* | 5/2018 | Vijayan | ................. | F16K 31/406 |
| 2020/0026313 A1* | 1/2020 | Weingarten | ........ | G05D 16/2097 |

OTHER PUBLICATIONS

Universal Mount/Quick Disconnect Linear Actuators Product Sheet, Bulletin #47.00, https://www.emerson.com/documents/automation/product-brochure-universal-mount-quick-disconnect-linear-actuators-bettis-en-en-6115210.pdf, 2018, 2 sheets.

* cited by examiner

200

260

260

SYSTEMS AND METHODS FOR VALVE ACTUATION

CROSS-REFERENCE TO RELATED APPLICATIONS

Not applicable.

BACKGROUND

Flow control devices, including valve systems, can be used in a variety of industrial, commercial, and other settings to regulate flow rate or pressure of a fluid flowing from a fluid source. In some applications, it may be useful to manage the flow rate, pressure, or other characteristics of a fluid flowing from the fluid source toward a downstream pipeline, application or device.

SUMMARY

Some examples of the present disclosure provide a valve system. The valve system can include a valve body having an inlet and an outlet. The inlet can provide an entrance to an upstream fluid passageway of the valve body and the outlet can provide an outlet to a downstream fluid passageway of the valve body. The valve system can also include a valve member and an actuator. The valve member can be arranged to fluidically couple the upstream fluid passageway and the downstream fluid passageway when the valve member is in an open position, and can fluidically decouple the upstream fluid passageway and the downstream fluid passageway when the valve member is in a closed position. The actuator can include an actuation chamber, an actuator member, ports, and a control system. The actuator member can be moveable within the actuation chamber to move the valve member between the open position and the closed position. The actuator member can form first and second sub-chambers in the actuation chamber. The ports can be arranged to permit flow from the upstream fluid passageway to the first and second sub-chambers of the actuation chamber, and to permit flow from the first and second sub-chambers of the actuation chamber to the downstream fluid passageway. The control system can be operable to selectively direct fluid flow from the upstream fluid passageway through one or more of the ports to the actuation chamber, and fluid flow from the actuation chamber through one or more of the ports to the downstream fluid passageway.

Some examples of the present disclosure provide an actuator for a valve. The valve can include a valve body that defines a valve inlet and a valve outlet, and a valve member moveable between an open position and a closed position to selectively permit or prevent flow from the valve inlet to the valve outlet. The actuator can include an actuation chamber, a piston system, and a control system. The piston system can include a piston that forms first and second actuation volumes within the actuation chamber and can be movable relative to the actuation chamber to move the valve member between the open and closed positions. The control system can control movement of the piston. The control system can include first and second flow controllers. The first flow controller can be arranged to selectively permit fluid flow from the valve inlet to one or more of the first and second actuation volumes within the actuation chamber. The second flow controller can be arranged to selectively permit fluid flow to the valve outlet from one or more of the first and second actuation volumes within the actuation chamber.

Some examples of the present disclosure can provide a method of controlling a valve with an actuator. The method can include moving a valve member of the valve toward a closed position to prevent flow from a valve inlet to a valve outlet, including by controlling one or more flow controllers of the actuator to: divert fluid from the valve inlet to a first actuation volume of an actuation chamber on a first side of a piston connected to the valve member, to increase pressure in the first actuation volume, and divert fluid from a second actuation volume of the actuation chamber on a second side of the piston to a valve outlet, to decrease pressure in the second actuation volume. The method can further include moving the valve member toward an open position to allow flow from the valve inlet to the valve outlet, including by controlling the one or more flow controllers to: divert fluid from the valve inlet to the second actuation volume of the actuation chamber, to increase pressure in the second actuation volume, and divert fluid from the first actuation volume of the actuation chamber to the valve outlet, to decrease pressure in the first actuation volume.

DETAILED DESCRIPTION

Figure 1:
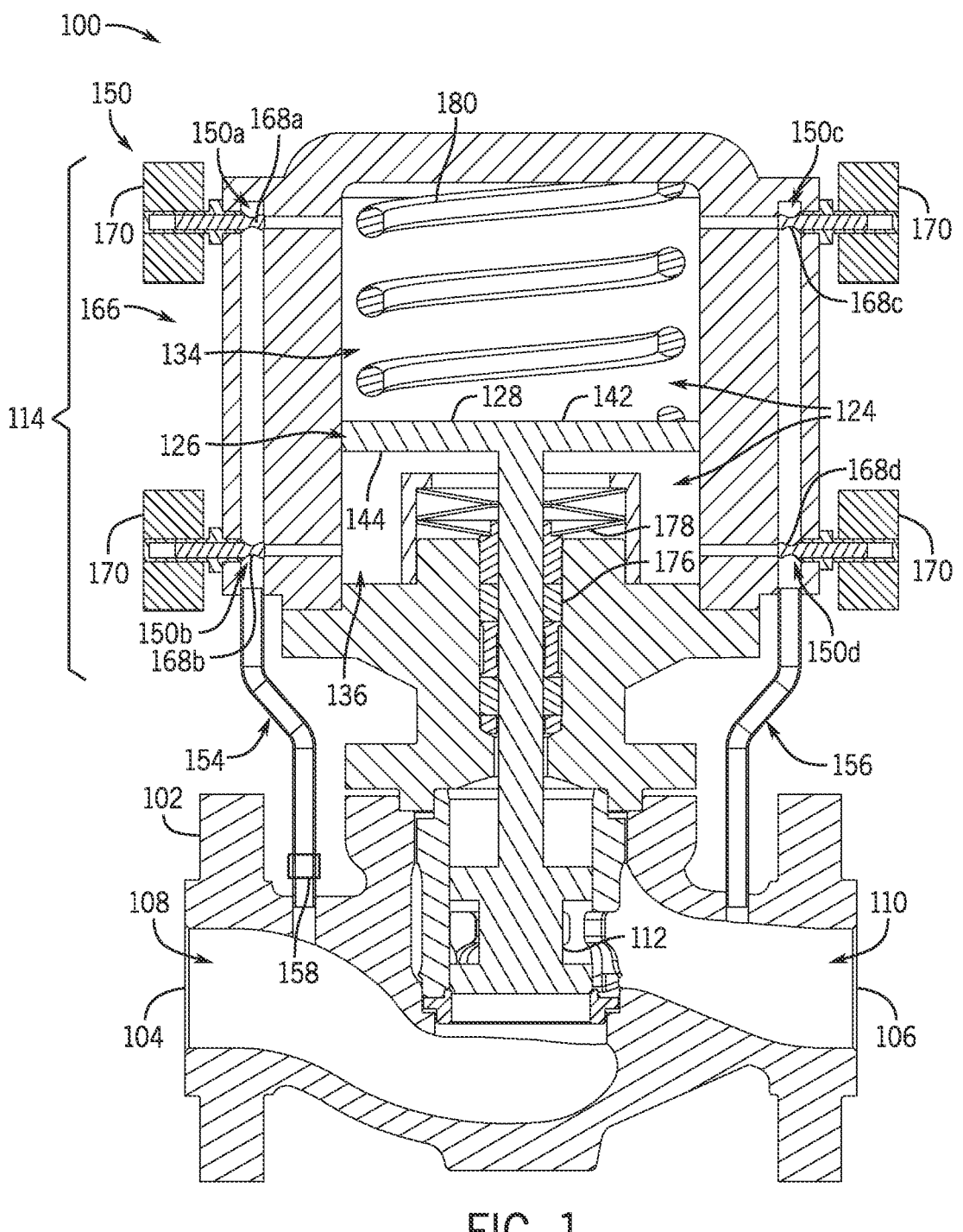
FIG. 1 is a cross-sectional view of a valve system according to an embodiment of the disclosed technology.

The concepts disclosed in this discussion are described and illustrated with reference to exemplary arrangements. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

While the valve systems disclosed herein may be embodied in many different forms, several specific embodiments are discussed herein with the understanding that the embodiments described in the present disclosure are to be considered only exemplifications of the principles described herein, and the disclosed technology is not intended to be limited to the examples illustrated.

Embodiments of the disclosed technology include a valve system that includes a valve body and a power module. The power module of the valve body can include an actuator arrangement that can be controlled remotely (or otherwise) and reduce (e.g., eliminate) the risk of leakage at the actuator arrangement and valve body to provide a zero emission valve system.

Some conventional valves include an actuator that can actuate a piston or other valve member to open and close the valve. In such conventional valves, the actuator may extend between an inside and an outside of the valve body of the valve, thereby requiring a seal at the actuator to prevent process fluid from escaping from inside the valve body and leaking into the atmosphere. In conventional valves where the actuator requires physical movement relative to the valve body, the seal at the actuator may be configured as a dynamic seal (e.g., a seal intended to reduce—but not stop—fluid leakage between relative moving components). Over time, it is not uncommon for dynamic seals to wear and eventually leak, causing potentially unwanted leakage and emission of process fluid to the atmosphere.

Embodiments of the present disclosure address these and other drawbacks of conventional valve systems. For example, embodiments of the valve systems described herein do not include any dynamic seals between an interior of the valve body and the atmosphere. Furthermore, embodiments of the present disclosure can employ process fluid pressure to exert force on the valve member to thereby stroke the valve. This can eliminate the requirement of outside power to act on the valve member to provide flow control.

FIGS. 1-6 illustrate exemplary valve systems according to embodiments of the disclosed technology. As also described below, the valve systems according to embodiments of the disclosed technology can include variations in form factor (e.g., variations in physical size, component geometry, assembly components, and fluid flow pathways) and can provide flow control for a wide range of flow rates.

FIG. 1 illustrates a valve system 100 according to an embodiment of the disclosed technology. The valve system 100 can include a valve body 102 having a valve inlet 104 and a valve outlet 106. The inlet 104 can at least partially define an upstream fluid passageway 108 and the outlet 106 can at least partially define a downstream fluid passageway 110 (e.g., may be formed as an entrance and an exit, respectively or otherwise, to the passageway 108 and the passageway 110). The valve system 100 can further include a valve member 112 and an actuator 114. The valve member 112 can be arranged within the valve body 102 to fluidically couple (or decouple) the upstream fluid passageway 108 and the downstream fluid passageway 110. That is, when the valve member 112 is in an open position, fluid can flow from the valve inlet 104 toward the valve outlet 106 and when the valve member 112 is in a closed position, fluid is prevented from flowing between the valve inlet 104 and the valve outlet 106. In some embodiments, the valve member 112 may be adjusted to intermediate positions between the open position and the closed position to controllably meter flow through the valve system 100.

The actuator 114 can include an actuation chamber 124 and a piston system 126. As shown, the actuation chamber 124 is formed in the valve body 102. The piston system 126 can include an actuator member 128 (e.g., a piston) that is seated within the actuation chamber 124 and divides the actuation chamber 124 into a sub-chamber 134 (e.g., a first actuation volume) and a sub-chamber 136 (e.g., a second actuation volume). Accordingly, a first side 142 of the actuator member 128 faces the sub-chamber 134 and a second side 144 of the actuator member 128 faces the sub-chamber 136.

With continued reference to FIG. 1, in the illustrated embodiment, the valve member 112 is unitarily formed with the actuator member 128 to form a single unitary body. For example, the single unitary body may be integrally formed from a single part without connections or couplings. Thus, the valve member 112 may be part of the piston system 126. However, in some embodiments, other configurations are possible, including the use of diaphragms or other piston system and valve member configurations. For example, an actuator member may be mechanically or otherwise tied to a valve member (e.g., with two or more bodies directly coupled together) so that movement of the actuator member corresponds to movement of the valve member.

As shown in FIG. 1, the valve system 100 can include a set of ports 150. In the illustrated embodiment, the valve body 102 can include a first port 150a, a second port 150b, a third port 150c, and a fourth port 150d. The set of ports 150 may be generally configured as inlets to the actuation chamber 124 (e.g., as passageways or other openings in the valve body 102). The first port 150a may be arranged to fluidically couple the upstream fluid passageway 108 to the sub-chamber 134, the second port 150b may be arranged to fluidically couple the upstream fluid passageway 108 to the sub-chamber 136, the third port 150c may be arranged to fluidically couple the sub-chamber 134 to the downstream passageway 110, and the fourth port 150d may be arranged to fluidically couple the sub-chamber 136 to the downstream passageway 110.

The valve system 100 can further include first and second actuation passageways 154, 156 that connect the upstream and downstream fluid passageways 108, 110, respectively, to the actuation chamber 124 via the set of ports 150. In the illustrated embodiment, the first and second actuation passageways 154, 156 extend outside of the valve body 102. However, in other embodiments, actuation passageways may be formed within the valve body (see, for example, FIG. 2). In general, the first actuation passageway 154 can facilitate selectively relaying high pressure (relative to the outlet 106) from the valve inlet 104 to the actuation chamber 124. Relatedly, the second actuation passageway 156 can facilitate selectively relieving high pressure from the actuation chamber 124 to the valve outlet 106. The first actuation passageway 154 can optionally include a filter 158. In use, the filter 158 can help prevent solid particles or other debris from passing through the set of ports 150 from the upstream fluid passageway 108.

As briefly described above, the valve member 112, via the actuator 114, can be used to selectively open and close valve system 100. According to embodiments of the disclosed technology, the actuator 114 can include a control system 166 to control the actuator member 128. The control system 166 can include flow controllers 168a-d that can allow or prevent fluid flow between the upstream fluid passageway 108 and the actuation chamber 124 and between the actuation chamber 124 and the downstream fluid passageway 110. In the illustrated embodiment, the flow controllers 168a-d are arranged at a respective port 150a-d of the set of ports 150. That is, in the embodiment shown in FIG. 1, the valve system 100 includes four ports 150a-d and a respective four flow controllers 168a-d. However, in other embodiments, fewer flow controllers may be used to direct fluid flow through a set of ports (see, for example, FIGS. 4-6).

Furthermore, in other embodiments, a valve system can include additional ports and additional flow controllers. For example, in the valve system 100, one or more of the ports 150a-d may be configured as a subset of multiple ports. Such an arrangement can thus provide primary ports and secondary ports to supplement fluid flow between the actuation chamber 124 and the upstream and downstream passageways 108, 110, which can in turn provide increased fluid flow into or out of the actuation chamber 124. In general, a valve system with an actuator having an array of ports and flow controllers in communication with a logic controller can improve a valve's speed of response to changing process conditions. As a result, the valve can experience a higher resolution of control which can allow the valve to maintain its set point with greater accuracy and less deviation to changing conditions.

Furthermore, such increase in fluid flow from primary and secondary ports can increase or modulate a stroking speed of the actuator 114, and thus, the valve member 112. In some cases, flow through primary and secondary ports can be controlled identically. Further, in some cases, a primary port can have a primary flow controller and a secondary port can have a secondary flow controller, to selectively control a rate at which any one or more chambers may be filled or drained.

In general, the flow controllers 168a-d can be configured as valve assemblies or other flow control devices of various known types that can block or permit flow into, out of, or through a particular port. For example, one or more of the flow controllers 168a-d can include a diaphragm or be configured as a solenoid valve assembly, or at least can include a movable, sealing portion of a solenoid system 170 (e.g., a solenoid-operated plug of various known types).

Notably, in some embodiments of the valve systems described herein (e.g., as shown in each of the FIGS.), the movable portions of the flow controllers (e.g., the sealing portion of a solenoid) are completely enclosed within the valve system. That is, the flow controllers are completely isolated from the atmosphere such that any flow (e.g., intentional flow or a leak) past the flow controllers would remain within the valve system (i.e., along an enclosed flow path between the valve inlet 104 and the valve outlet 106) without venting to the atmosphere. This isolation of the flow controllers can allow the valve systems described herein to be configured as zero emission valve systems.

In contrast to the technology disclosed herein, and briefly described above, some conventional valve systems can include an actuator that extends between the inside and the outside of a valve body (i.e., across an exterior wall of the valve body). In such conventional valves, a dynamic seal may be used to prevent leakage between the valve system and the atmosphere at the actuator. In general, a dynamic seal is characterized by a seal between two bodies that move relative to one another. Thus, in conventional valves, if a dynamic seal at an actuator wears or fails, there is a risk of unwanted fluid being emitted into the atmosphere surrounding the valve. As discussed herein, embodiments of the present inventive subject matter can address these and other drawbacks of conventional valves.

With continued reference to FIG. 1, various operating principles of the valve system 100 will be described. For example, in use, to close the valve 100, the control system 166 can direct the first flow controller 168a to open to permit fluid flow from the upstream fluid passageway 110, through the first port 150a, and into the sub-chamber 134 of the actuation chamber 124. The control system 166 can also direct the fourth flow controller 168d to open and permit fluid flow from the sub-chamber 136 of the actuation chamber 124, through the fourth port 150b, and into the downstream fluid passageway 110. In this regard, when the valve system 100 is installed within a working pipeline or other fluid flowing system, the pressure at the valve inlet 104 is typically higher than the pressure at the valve outlet 106. As a result, in a valve closing event, higher pressure acts on the first side 142 of the actuator member 128 to move the actuator member 128 and thus move the valve member 112 toward the closed position.

Similar to the valve close sequence described above, to open the valve 100, the control system 166 can direct the third flow controller 168c to open to permit fluid flow from the sub-chamber 134 of the actuation chamber 124, through the third port 150c, and into the downstream fluid passageway 110. In parallel or after a delay, the control system 166 can direct the second flow controller 168b to open to permit fluid flow from the upstream fluid passageway 110, through the second port 150b, and into the sub-chamber 136 of the actuation chamber 124. Thus, in the valve opening event, higher pressure from the upstream fluid passageway 108 acts on the second side 144 of the actuator member 128 to move the actuator member 128, and thus move the valve member 112 toward the open position.

In some embodiments, the control system 166 may control a set of flow controllers (e.g., the flow controllers 168a, 168b) to permit or block flow in parallel (i.e., at substantially the same time, such as within 0 to 5 seconds, or 0 to 2 seconds, of each other). In some embodiments, the control system 166 may provide a delay between actuating flow controllers. For example, the control system 166 may instruct the flow controller 168c in communication with the downstream fluid passageway 110 to open before instructing the flow controller 168b in communication with the upstream fluid passageway 108 to open, or may instruct the flow controller 168d to open before instructing the flow controller 168a to open (depending on whether the control system 166 is executing valve open or valve close instructions). Opening the flow controller 168c, 168d that is in communication with the downstream fluid passageway 110 before the flow controller 168a, 168b that is in communication with the upstream fluid passageway 108 can relieve pressure in the actuation chamber 124 and prevent over pressurization from the high pressure fluid of the upstream fluid passageway 108. In general, however, each of the flow controllers 168a-d may be controlled independently with a variety of relative timings.

As briefly described above, dynamic seals generally include seals between two bodies that have relative movement between them. Advantageously, embodiments of the present disclosure can provide valve actuation without including any dynamic seals that extend between the valve body 102 and the atmosphere surrounding the valve body 102. For example, as generally shown in FIG. 1, threaded cap structures or other sealed-volume fasteners can be used to secure the solenoid systems 170 to the valve body 102 to eliminate the need for a dynamic seal at flow controllers 168a-d, and no parts of the piston system 126 needs to extend outside of the enclosed system overall.

However, in some embodiments, the valve system 100 can include a stem seal or other internal seal 176. The internal seal 176 may be generally configured as a dynamic seal between a portion of the piston system 126 that moves relative to the valve body 102.

As shown, the internal seal 176 can provide fluid separation between the actuation chamber 124 and the valve outlet 106. In some embodiments, the internal seal 176 can include a variety of seals or seal materials, such as, for example, valve packing material (e.g., live loaded packing and a secondary spring 178, such as one or more Belleville washers), elastomeric or metal gaskets, diaphragms, graphite, and other mechanical seals. In the illustrated embodiment, if any process fluid does happen to leak past the internal seal 176, the leaked fluid flows through the valve outlet 106, thus simply manifesting as output material causing little to no disruption to the system, and notably, not emitting to the atmosphere.

Furthermore, the valve system 100 can optionally include one or more springs. For example, a biasing spring 180 can be in communication with the actuator member 128 to bias the valve member 112 toward a normally-closed position. That is, the biasing spring 180 of FIG. 1 is disposed between a first side 142 of the actuator member 128 and a surface of the valve body 102 within the actuation chamber 124. In use, the biasing spring 180 can urge the valve member 112 toward a closed position if the control system 166 stops supplying (sufficient) actuation pressure to the actuation chamber 124. Furthermore, the biasing spring 180 can provide a startup orientation for the valve member 112 so that the valve member 112 is not floating without a set open or closed position when the valve system 100 is first installed in a fluid flow system.

FIGS. 2-6 illustrate additional examples of valve systems according to embodiments of the disclosed technology. In general, similar reference numbers will be used to describe the following examples for similar components described in the valve system 100, where applicable. For example, the valve system 200 shown in FIGS. 2 and 3, like the valve system 100, can include a valve body 202 having an inlet 204 and an outlet 206. The inlet 204 can at least partially define an upstream fluid passageway 208 and the outlet 206 can at least partially define a downstream fluid passageway 210.

It should be appreciated that the overall control and operating principles for the following examples are substantially similar to those discussed above with reference to FIG. 1, unless indicated otherwise. Further, components, geometries, and orientations of one or more examples described herein can be adapted to be additionally or alternatively included into these or other valve systems, including with respect to a particular valve system orientation or configuration.

Figure 2:
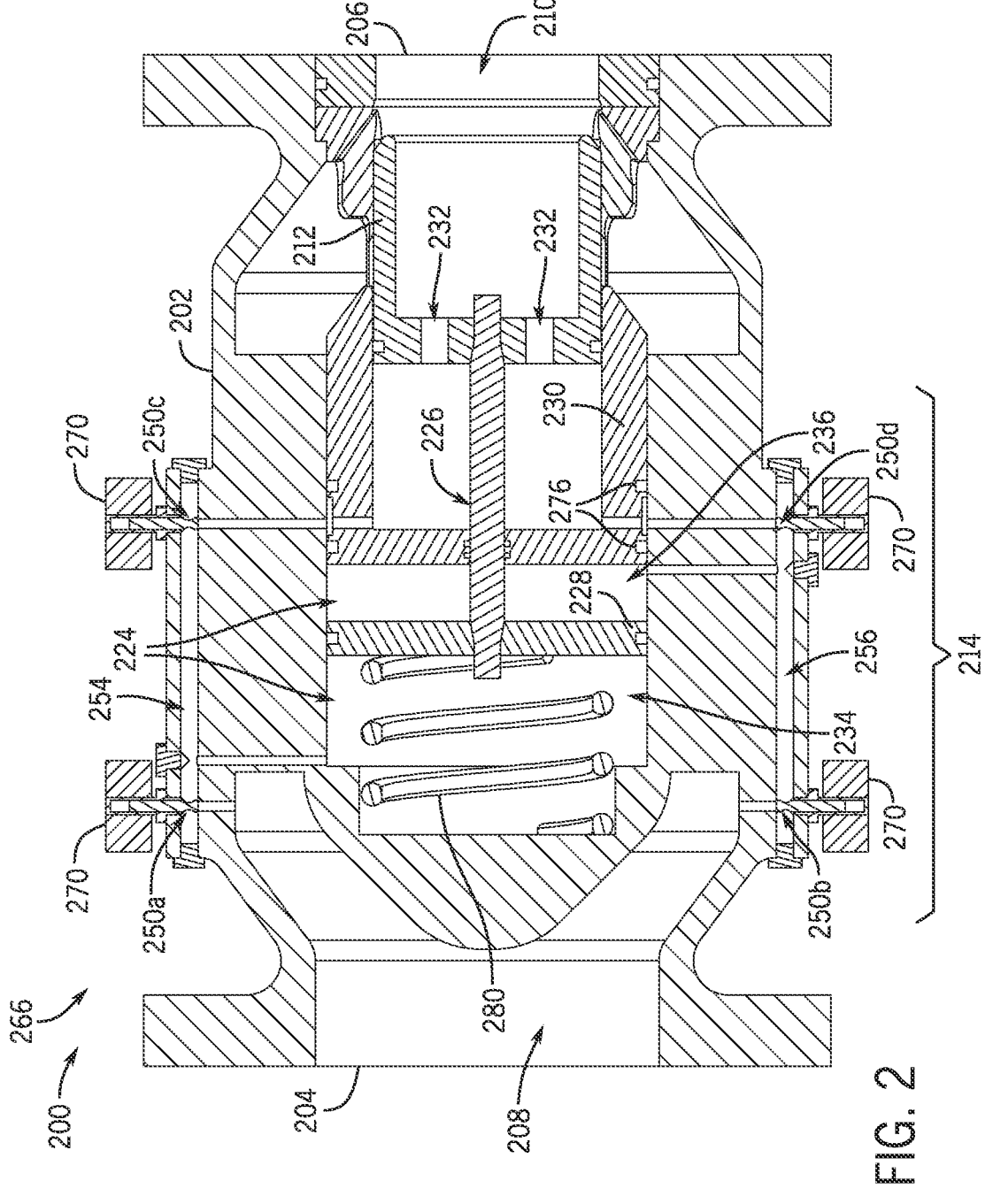
FIG. 2 is a cross-sectional view of a valve system according to another embodiment of the disclosed technology.
Figure 3:
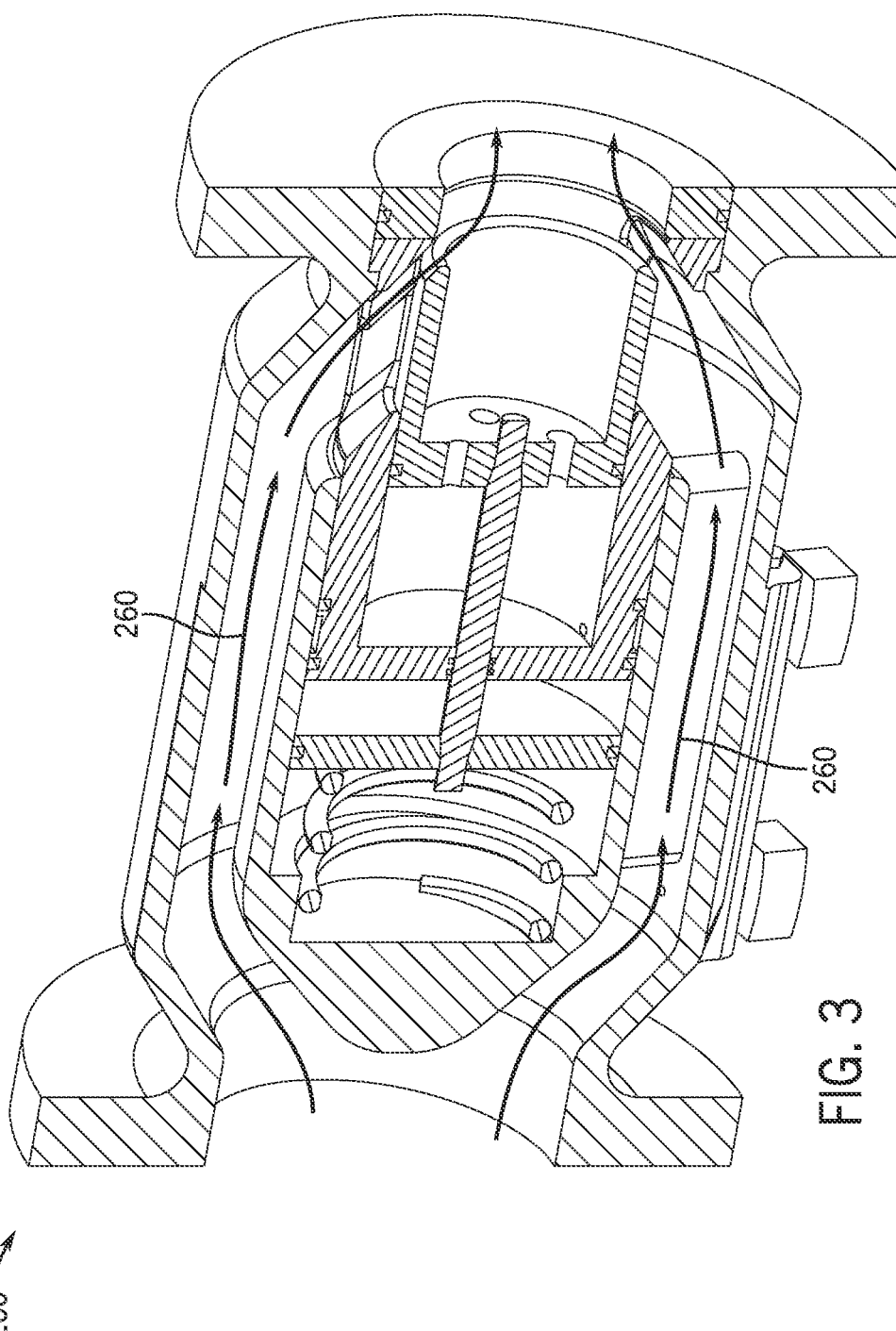
FIG. 3 is an isometric cross-sectional view of the valve system of FIG. 2 showing an exemplary flow path.

With continued reference to FIGS. 2 and 3, the valve system 200 can include a valve member 212 and an actuator 214. Like the valve system 100, the actuator 214 of the valve system 200 can include an actuation chamber 224 and a piston system 226. The piston system 226 can include a piston plate or otherwise an actuator member 228. The actuator member 228 can be mechanically tied to (or in some embodiments, unitarily formed with) the valve member 212. The actuator member 228 can split the actuation chamber 224 into first and second chambers 234, 236.

As shown in FIG. 2, the valve system 200 can include a set of ports 250. In the illustrated embodiment, the valve body 202 can include a first port 250*a*, a second port 250*b*, a third port 250*c*, and a fourth port 250*d*. The set of ports 250 may be generally configured as inlets to passageways through the valve body 202. The first port 250*a* may be arranged to fluidically couple the upstream fluid passageway 208 to the first chamber 234, the second port 250*b* may be arranged to fluidically couple the upstream fluid passageway 208 to the second chamber 236, the third port 250*c* may be arranged to fluidically couple the first chamber 234 to the downstream passageway 210, and the fourth port 250*d* may be arranged to fluidically couple the second chamber 236 to the downstream passageway 210.

The valve system 200 can further include first and second actuation passageways 254, 256 that connect the upstream and downstream fluid passageways 208, 210, to the actuation chamber 224 via the set of ports 250. In the illustrated embodiment, the first and second actuation passageways

254, 256 are formed within the valve body 202. The first and second actuation passageways 254, 256 generally extend in an axial direction. That is, the valve body 202 can define an axial direction (i.e., an axial flow direction) between the valve inlet 204 and the valve outlet 206. Furthermore, in the illustrated embodiment, each of the valve member 212 and the actuator member 228 can move along the axial direction to open and close the valve 200. FIG. 3 illustrates an exemplary flow path 260 through the valve body 202.

As described above, the valve member 212, via the actuator 214, can be used to selectively open and close the valve system 200. Accordingly, the actuator 214 can include a control system 266. The control system 266 can include flow controllers (e.g., a flow control member of a solenoid 270). Via the solenoids 270, the flow control members can allow or prevent fluid flow between the upstream fluid passageway 208 and the actuation chamber 224 and between the actuation chamber 224 and the downstream fluid passageway 210. In the illustrated embodiment, the solenoids 270 are arranged at a respective port 250*a-d* of the set of ports 250.

Like the valve system 100 of FIG. 1, in use, the control system 266 of the valve system 200 can instruct the associated solenoids 270 at the first and fourth ports 250*a*, 250*d* to open. This allows pressurized fluid from the upstream fluid passageway 208 to fill the first chamber 234 and allows fluid within the second chamber 236 to be expelled to the downstream fluid passageway 210, thereby moving the valve member 212 to the closed position. Likewise, in use, the control system 266 can instruct the associated solenoids 270 at the second and third ports 250*b*, 250*c*. This allows pressurized fluid from the upstream fluid passageway 208 to fill the second chamber 236 and allows fluid within the first chamber 234 to be expelled to the downstream fluid passageway 210, thereby moving the valve member 212 to the open position.

Also like the valve system 100, the valve system 200 (and generally, all valve systems described herein) does not include any dynamic seals between the valve body 202 and the atmosphere surrounding the valve body 202. The valve 200 can, however, include an internal seal 276. The internal seal 276 can be configured as an annular seal about a piston cup 230 within which the valve member 212 slides axially. The internal seal 276 can provide fluidic separation between the actuation chamber 224 and the valve outlet 206. Furthermore, as illustrated in FIGS. 2 and 3, the valve member 212 can include balancing holes 232 to communicate pressure (e.g., a low pressure or downstream pressure) between the second chamber 236 and the valve outlet 206.

The valve system 200 can optionally include one or more springs (or other biasing bodies). For example, a biasing spring 280 can be in mechanical communication with the actuator member 228 to bias the valve member 212 toward a normally-closed position. That is, the biasing spring 280 of FIGS. 2 and 3 is disposed between the actuator member 228 and a surface of the valve body 202 within the actuation chamber 224. In use, the biasing spring 280 can urge the valve member 212 to a closed position if the control system 166 does not supply sufficient actuation pressure to move the valve member 212 toward the closed position. In other embodiments, the biasing spring 280 can be positioned to bias the valve member 212 toward a normally-open configuration (see, for example, FIG. 6).

Figure 4:
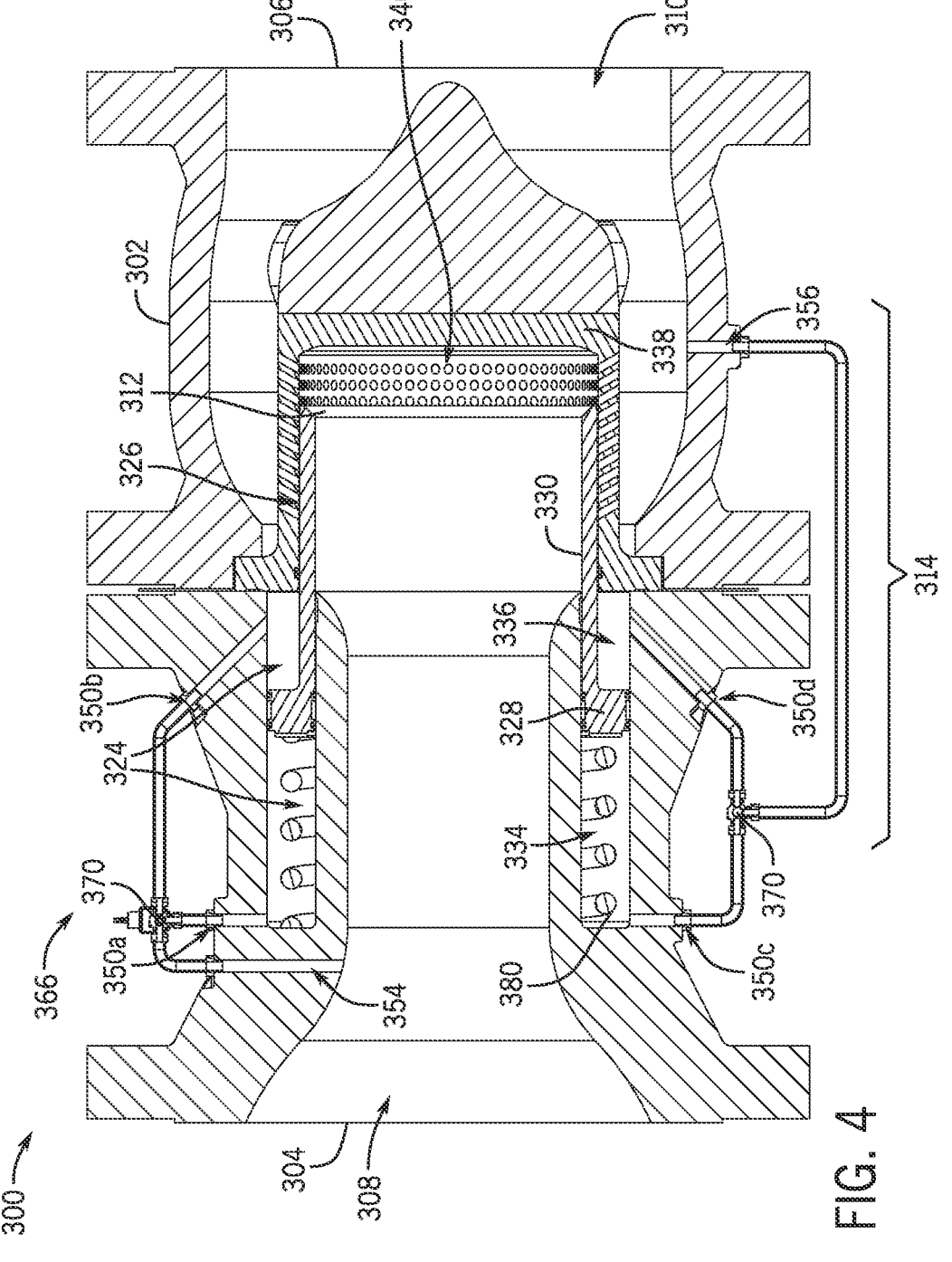
FIG. 4 is a cross-sectional view of a valve system according to another embodiment of the disclosed technology.
Figure 5:
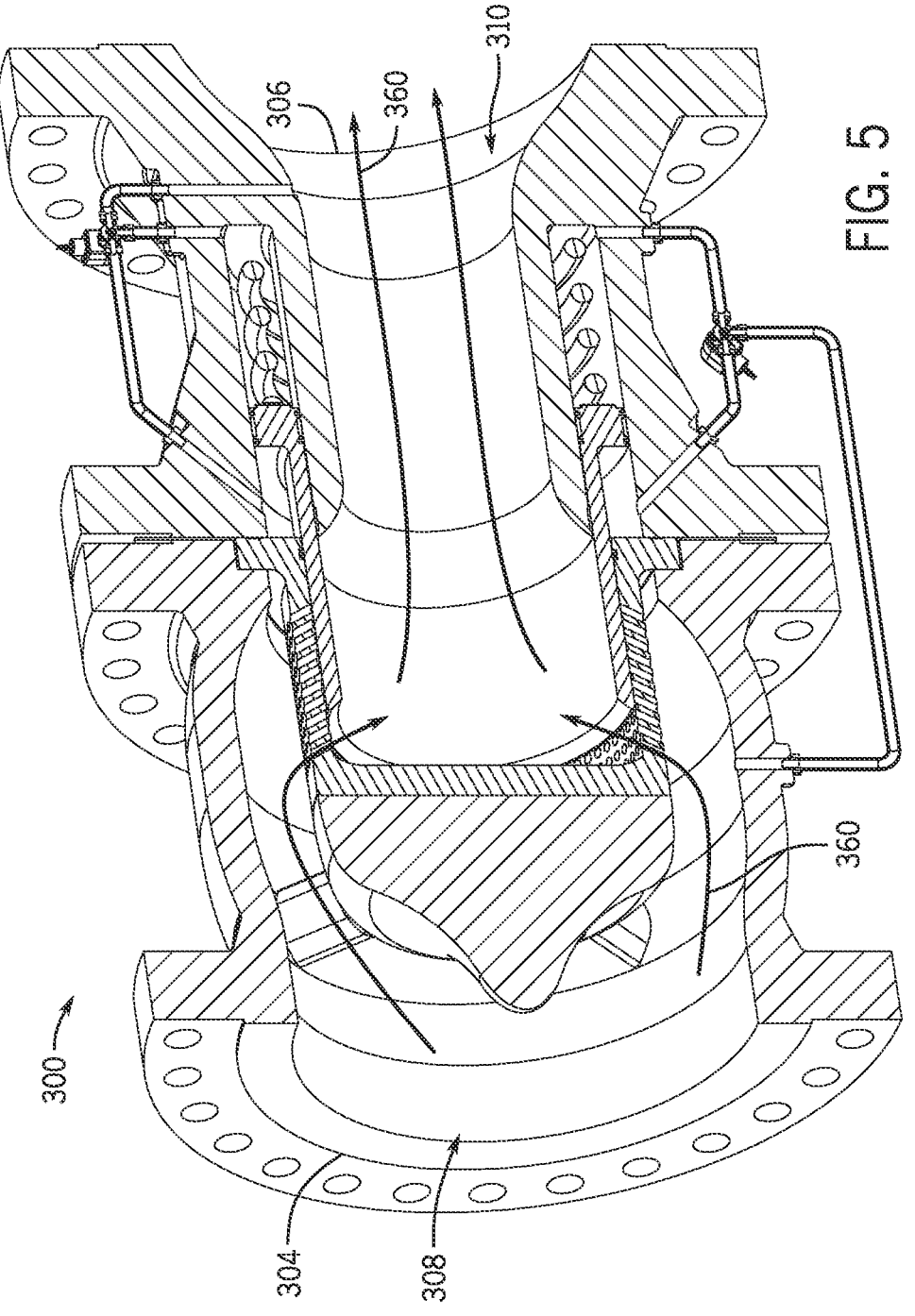
FIG. 5 is an isometric cross-sectional view of the valve system of FIG. 3 showing an exemplary flow path.
Figure 6:
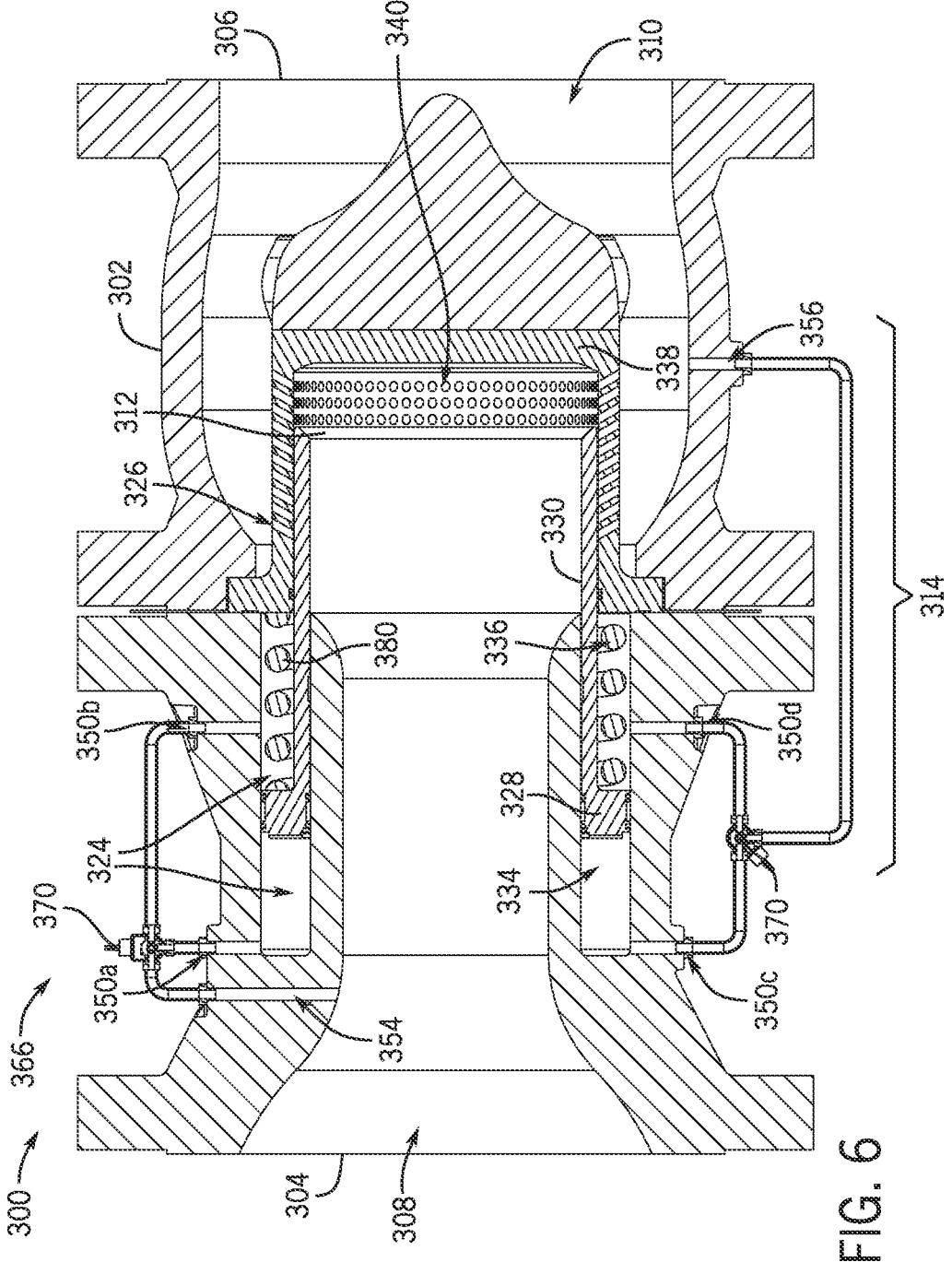
FIG. 6 is a cross-sectional view of a valve system according to another embodiment of the disclosed technology.

FIGS. 4-6 illustrate additional examples of valve systems according to embodiments of the disclosed technology. As noted above, similar reference numbers will be used to describe the following examples for similar components described in the valve systems above, where applicable. For example, the valve system 300 shown in FIGS. 4-6 can include a valve body 302 having an inlet 304 and an outlet 306. The inlet 304 can at least partially define an upstream fluid passageway 308 and the outlet 306 can at least partially define a downstream fluid passageway 310.

FIGS. 4 and 5 illustrate the valve system 300 with a biasing spring 380 arranged to bias a valve member 312 toward a normally-closed position. In contrast, FIG. 6 illustrates the valve system 300 with the biasing spring 380 arranged to bias the valve member 312 toward a normally-open position.

With reference to FIGS. 4-6, the valve system 300 can include the valve member 312 and the actuator 314. Like the valve systems described above, the actuator 314 of the valve system 300 can include an actuation chamber 324 and a piston system 326. The piston system 326 can include an actuation member 328 (e.g., a flange) of a piston plug 330. The piston plug 330 can include the valve member 312 at an end axially opposite from the actuation member 328. The annular flange of the actuation member 328 can divide the actuation chamber 324 into first and second chambers (e.g., volumes) 334, 336.

The piston system 326 can further include a piston cage 338. The piston plug 330 can be slidably received within the piston cage 338 to open and close the valve 300. The piston cage 338 can include openings 340 (e.g., anti-cavitation openings). The openings 340 can be generally configured as a mesh or array of openings that extend circumferentially about the piston cage 338 and permit fluid flow therethrough when then valve member 312 is in an open position (e.g., the orientation shown in FIG. 4).

The openings 340 can be used to reduce localized pressure imbalances and/or provide noise abatement. In use, different openings 340 (e.g., variations in size, density, placement, orientation, etc.) can be employed based on desired output effects (e.g., noise abatement, cavitation abatement, flow characteristic) or fluid characteristics (e.g., fluid medium, temperature, pressure, flowrate, etc.). In some embodiments, the openings 340 can be angled to thereby increase a flow efficiency (i.e., a flow loss reduction) during an axial flow operation. For example, the openings 340 can be angled with respect to a flow axis, as opposed to a perpendicular orientation with respect to the flow axis.

As shown in FIGS. 4-6, the valve system 300 can include a set of ports 350. In the illustrated embodiment, the valve body 302 can include a first port 350a, a second port 350b, a third port 350c, and a fourth port 350d. The set of ports 350 may be generally configured as inlets to passageways through the valve body 302. The first port 350a may be arranged to fluidically couple the upstream fluid passageway 308 to the first chamber 334, the second port 350b may be arranged to fluidically couple the upstream fluid passageway 308 to the second chamber 336, the third port 350c may be arranged to fluidically couple the first chamber 334 to the downstream passageway 310, and the fourth port 350d may be arranged to fluidically couple the second chamber 336 to the downstream passageway 310.

The valve system 300 can further include first and second actuation passageways 354, 356 that connect the upstream and downstream fluid passageways 308, 310 to the actuation chamber 324 via the set of ports 350. In the illustrated embodiment, the first and second actuation passageways 354, 356 are at least partially formed within the valve body 302. Furthermore, similar to the valve system 200, in the illustrated embodiments of FIGS. 4-6, each of the valve member 312 and the actuator member 328 can move along the axial direction (e.g., the axial direction defined by the flow path between the inlet 304 and the outlet 306) to open and close the valve 300. FIG. 5 illustrates an optional flow path 360 through the valve body 202. The optional flow path 360 may be opposite that of the valve system 300 of FIG. 4.

The piston system 326 can be used to selectively open and close the valve system 300 via a control system 366. The control system 366 can include flow controllers (e.g., a flow control body of a solenoid 370). Via the solenoids 370, the flow control bodies can allow or prevent fluid flow between the upstream fluid passageway 308 and the actuation chamber 324 and between the actuation chamber 324 and the downstream fluid passageway 310.

The embodiments shown in FIGS. 4-6 notably include only first and second solenoids 370. However, it should be appreciated, that a flow control system (e.g., four solenoids) similar to the valve systems 100 and 200 could be used in the valve system 300. Alternatively, additional solenoids could be used at secondary ports to supplement fluid flow between the actuation chamber and the upstream and downstream passageways to increase fluid flow into or out of the actuation chamber to increase stroking speed of the valve member. Additional solenoids in communication with a logic controller can also provide improved modulation or control of a process loop by improving feedback time and control to the valve system.

As shown in FIGS. 4-6, the solenoids 370 can be configured as 3-way, 2-position solenoids. In general, this allows a single solenoid to direct fluid into either of the chambers 334, 336, and likewise, a single solenoid to direct fluid out of either of the chambers 334, 336.

Each of the valve systems described above can be used in a system to control a variety of flow rates (e.g., over a variety of different low and high flow rate ranges). The valve system configurations shown in FIGS. 1-6 may be by way of example and can include other arrangements not necessarily shown in a single embodiment (e.g., substitution or combination of any number of components from two or more embodiments).

Figure 7:
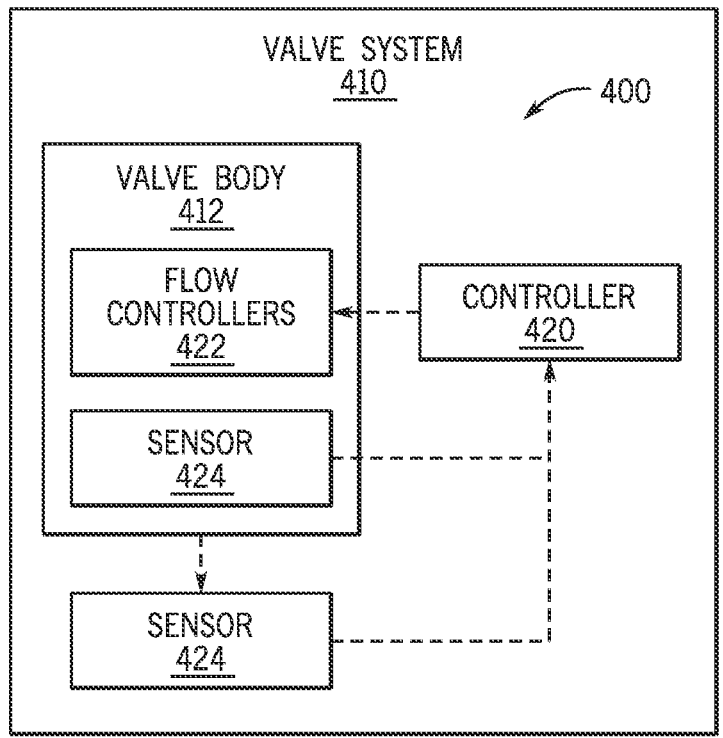
FIG. 7 is a schematic illustration of a control system for a valve according to an embodiment of the disclosed technology.

FIG. 7 includes a schematic illustration of a control system 400 that may be included in a variety of valve systems, including those described herein or others. The control system 400 can be used with a valve system 410 (which can include any of the valve systems 100, 200, 300 described above). The control system 400 can include a logic controller 420 configured to control one or more flow controllers 422 (e.g., solenoids) arranged within a valve body 412 of the valve system 410. The logic controller 420 can be configured according to various known approaches for automated devices to control valve operation (or otherwise direct flow), including known types of electronic control devices (e.g., general or special purpose computing devices). Generally, the logic controller 420 can be in communication (e.g., wirelessly) with the flow controllers 422 and, as applicable, with one or more sensors 424 (e.g., a sensor system included in the valve body 412 or external to the valve body 412).

Accordingly, the logic controller 420 can be used to control operation of valve system via control of the flow controllers 422 (e.g., based on input from the sensors 424). For example, in use, the controller 420 can signal for a first and a fourth of the flow controllers 422 to open to selectively direct fluid flow to move the valve system 410 into a closed position. Likewise, for example, the controller 420 can single for a second and a third of the flow controller 422 to open to selectively directly fluid flow to move the valve system 410 into an open position.

11

The one or more sensors 424 can include a variety of sensors that may be integrated within the valve body 412 or positioned outside of the valve body 412. The sensors 424 can provide travel feedback signals to the controller 420 based on a position of a valve member of the valve system 410. In other examples, the sensors 424 can provide magnetic feedback signals or pressure feedback signals based on a position (e.g., relative position) of a valve member. Still, other examples of sensors 424 can include sensors that assess flow characteristics (e.g., pressure, temperature, flow, volume, etc.), such as pressure sensors, temperature sensors, and flowrate sensors. In general, the one or more sensors 424 can be used to relay valve or fluid information to the logic controller 420 so that the logic controller 420 (e.g., automatically or in cooperation with an operator) can determine a present (or changing) state of the valve system 410 and can instruct the flow controllers 422 to execute a valve opening or valve closing sequence accordingly.

Thus, examples of the disclosed technology can provide an improvement over conventional valve and valve control systems. The previous description of the disclosed examples is provided to enable any person skilled in the art to make or use the disclosed technology. Various modifications to these examples will be readily apparent to those skilled in the art, and the generic principles defined herein may be applied to other examples without departing from the spirit or scope of the disclosed technology. Thus, the disclosed technology is not intended to be limited to the examples shown herein but is to be accorded the widest scope consistent with the principles and novel features disclosed herein As used herein, unless otherwise limited or defined, "unitary" and derivatives thereof (e.g., "unitarily") describe elements that are manufactured as a single piece without fasteners, adhesive, or the like to secure separate components together. For example, an element that is stamped, cast, or otherwise molded as a single-piece component from a single piece of sheet metal or other continuous single piece of material (e.g., molded polymer), without rivets, screws, other fasteners, or adhesive to hold separately formed pieces together, is a unitary (and unitarily formed) element. In contrast, an element formed from multiple pieces that are separately formed initially then later fastened together, is not a unitary (or unitarily formed) element.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

In some implementations, devices or systems disclosed herein can be utilized, manufactured, installed, etc. using methods embodying aspects of the disclosed technology. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the disclosed technology, of the utilized features and implemented capabilities of such device or system.

Also as used herein, unless otherwise defined or limited, directional terms are used for convenience of reference for discussion of particular figures or examples or to indicate spatial relationships relative to particular other components or context, but are not intended to indicate absolute orientation. For example, references to downward, forward, or other directions, or to top, rear, or other positions (or features) may be used to discuss aspects of a particular example or figure, but do not necessarily require similar orientation or geometry in all installations or configurations.

Also as used herein, unless otherwise limited or defined, "configured to" indicates that a component, system, or module is particularly adapted for the associated functionality. Thus, for example, a ZZ configured to YY is specifically adapted to YY, as opposed to merely being generally capable of doing so.

Although the presently disclosed technology has been described with reference to preferred examples, workers skilled in the art will recognize that changes may be made in form and detail to the disclosed examples without departing from the spirit and scope of the concepts discussed herein.

The invention claimed is:
1. A valve system, comprising:
a valve body having an inlet and an outlet, the inlet providing an entrance to an upstream fluid passageway of the valve body, and the outlet providing an outlet to a downstream fluid passageway of the valve body;
a valve member arranged to fluidically couple the upstream fluid passageway and the downstream fluid passageway when the valve member is in an open position, and to fluidly decouple the upstream fluid passageway and the downstream fluid passageway when the valve member is in a closed position; and
an actuator comprising:
an actuation chamber;
an actuator member movable within the actuation chamber to move the valve member between the open position and the closed position, the actuator member forming first and second sub-chambers in the actuation chamber;
a first flow path arranged to permit one-way flow from the upstream fluid passageway to the first and second sub-chambers of the actuation chamber, and a second flow path to permit one-way flow from the first and second sub-chambers of the actuation chamber to the downstream fluid passageway; and a control system operable to selectively direct fluid flow from the upstream fluid passageway through the first flow path to the actuation chamber, and fluid flow from the actuation chamber through the second flow path to the downstream fluid passageway.

2. The valve system of claim 1, wherein the control system includes two or more flow controllers secured to the valve body to control flow through the first flow path and the second flow path.

3. The valve system of claim 2, wherein there is no dynamic seal between the actuator and an atmosphere outside of the valve body.

4. The valve system of claim 2, wherein the two or more flow controllers include:

a first solenoid system that selectively permits flow from the upstream fluid passageway through the first flow path; and a second solenoid system that selectively permits flow from the second flow path to the downstream fluid passageway.

5. The valve system of claim 2, wherein the control system includes a sensor system arranged to provide sensor signals based on flow characteristics; and wherein the control system selectively directs fluid flow to and from the actuation chamber based on the sensor signals.

6. The valve system of claim 1, wherein the first flow path includes a plurality of first ports arranged to permit flow from the upstream fluid passageway to the first and second sub-chambers of the actuation chamber, and the second flow path includes a plurality of second ports arranged to permit flow from the first and second sub-chambers to the downstream fluid passageway.

7. The valve system of claim 6, wherein the ports include:

a first port arranged to permit flow between the upstream fluid passageway and the first sub-chamber of the actuation chamber;

a second port arranged to permit flow between the upstream fluid passageway and the second sub-chamber of the actuation chamber;

a third port arranged to permit flow between the first sub-chamber of the actuation chamber and the downstream fluid passageway; and a fourth port arranged to permit flow between the second sub-chamber of the actuation chamber and the downstream fluid passageway, wherein the valve member is urged toward the closed position when the first and fourth ports are opened and the second and third ports are closed, and wherein the valve member is urged toward the open position when the second and third ports are opened and the first and fourth ports are closed.

8. The valve system of claim 7, wherein the control system includes a first three-way flow controller that selectively permits flow to the first and second ports, and a second three-way flow controller that selectively permits flow from the third and fourth ports.

9. The valve system of claim 1, wherein the actuation chamber is formed in the valve body.

10. The valve system of claim 1, wherein the actuation chamber is axially aligned with the inlet and the outlet.

11. An actuator for a valve, the valve having a valve body that defines a valve inlet and a valve outlet, and a valve member movable between an open position and a closed position to selectively permit or prevent flow from the valve inlet to the valve outlet, the actuator comprising:

an actuation chamber;

a piston system including a piston that forms first and second actuation volumes within the actuation chamber and is movable relative to the actuation chamber to move the valve member between the open and closed positions; and a control system to control movement of the piston, the control system including:

a first flow controller arranged to selectively permit one-way fluid flow from the valve inlet to one or more of the first and second actuation volumes within the actuation chamber, and a second flow controller arranged to selectively permit one-way fluid flow to the valve outlet from one or more of the first and second actuation volumes within the actuation chamber.

12. The actuator of claim 11, wherein the control system includes a sensor system arranged to measure a flow characteristic.

13. The actuator of claim 11, wherein the first and second flow controllers are configured as a two-position, three-way solenoids.

14. The actuator of claim 11, wherein fluid flow from the valve inlet to the valve outlet defines an axial direction, and wherein the piston is movable in the axial direction.

15. The actuator of claim 14, wherein the piston is configured as a piston plug that is received by a piston cage to form an annular piston, and wherein the piston cage is secured relative to the valve body and the piston plug is movable in an axial direction relative to the piston cage.

16. The actuator of claim 15, wherein the piston cage includes a plurality of openings arranged circumferentially about the piston cage.

17. The actuator of claim 11, further comprising a seal between the second actuation volume and the outlet.

18. The actuator of claim 11, wherein one or more of:

the valve member is urged toward the closed position when the first flow controller permits fluid flow from the valve inlet to the first actuation volume and the second flow controller permits fluid flow from the second actuation volume to the valve outlet, or the valve member is urged toward the open position when the first flow controller permits fluid flow from the valve inlet to the second actuation volume and the second flow controller permits fluid flow from the first actuation volume to the valve outlet.

19. A method of controlling a valve with an actuator, the method comprising:

moving a valve member of the valve toward a closed position to prevent flow from a valve inlet to a valve outlet, including by controlling one or more flow controllers of the actuator to:

divert fluid via a first one-way flow path from the valve inlet to a first actuation volume of an actuation chamber on a first side of a piston connected to the valve member, to increase pressure in the first actuation volume, and divert fluid via a second one-way flow path from a second actuation volume of the actuation chamber on a second side of the piston to the valve outlet, to decrease pressure in the second actuation volume; and moving the valve member toward an open position to allow flow from the valve inlet to the valve outlet, including by controlling the one or more flow controllers to:

divert fluid via the first one-way flow path from the valve inlet to the second actuation volume of the actuation chamber, to increase pressure in the second actuation volume, and divert fluid via the second one-way flow path from the first actuation volume of the actuation chamber to the valve outlet, to decrease pressure in the first actuation volume.

20. The method of claim 19, wherein the one or more flow controllers include one or more solenoid systems that are secured to a valve body of the valve with no dynamic seals between the actuator and an atmosphere outside the valve body.

* * * * *